United States Patent Office 3,143,711
Patented Aug. 4, 1964

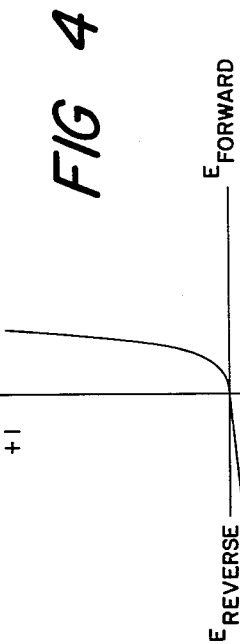
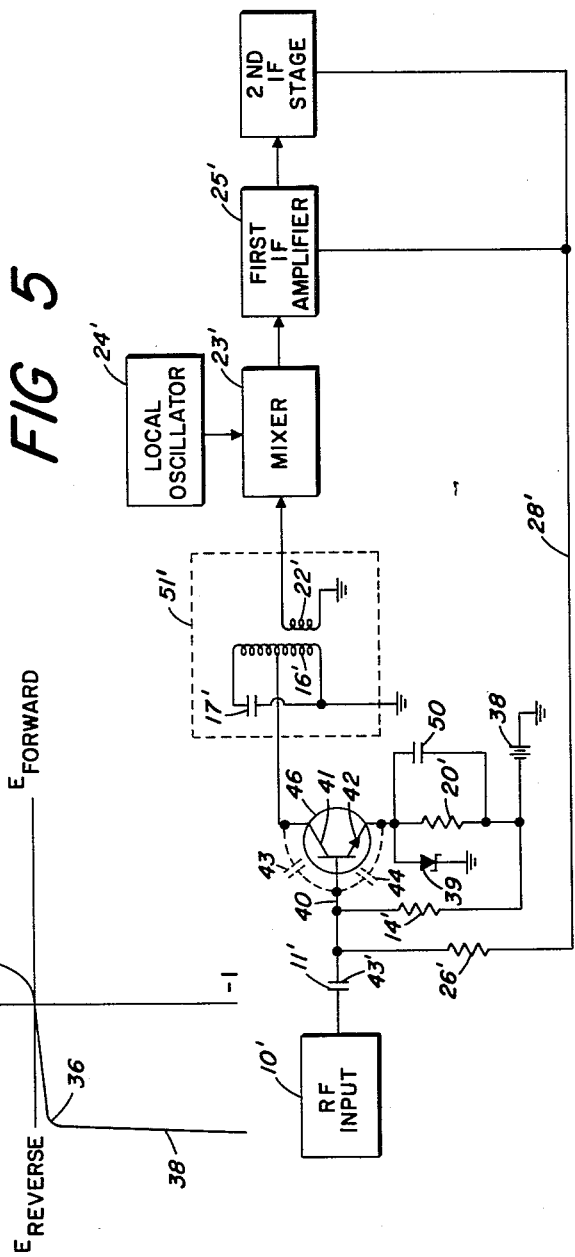
*INVENTOR.*
*EMANUEL F. READ*
BY *Moody and Phillion*
*ATTORNEYS*

3,143,711
TRANSISTOR AMPLIFIER CUTOFF MEANS AT
HIGH SIGNAL LEVELS
Emanuel F. Read, Cedar Rapids, Iowa, assignor to
Collins Radio Company, Cedar Rapids, Iowa, a corporation of Iowa
Filed Apr. 14, 1961, Ser. No. 103,117
3 Claims. (Cl. 330—24)

This invention relates generally to automatic gain controls and, more specifically, to an automatic gain control for a low distortion transistor amplifier stage.

In the prior art there are many amplifiers which can handle signals varying over a large amplitude range. One particular example where such a range of amplitudes might be encountered is the landing approach signal (commonly called a glide slope signal) which is received by aircraft approaching an airport landing strip. As the aircraft approaches the landing field the signal will become increasingly stronger until the aircraft is about to land, at which time the signal is near its peak. In the prior art radio receivers receiving these landing signals have employed vacuum tubes which are capable of handling the signals fairly easily. However, both space and weight are at a premium in modern aircraft and considerable effort is being expended in reducing the size and the weight of airborne gear, such as electronic equipment. One of the more obvious ways that the weight of electronic equipment can be reduced is to replace the radio tubes with transistors. It has been found, however, that a transistorized R-F stage in a radio receiver has certain operational difficulties which prevent efficient operation over the range of signals encountered as the aircraft approaches the air field. More specifically, when the aircraft is quite near the landing field, the received signal becomes so strong that the transistorized R-F stage becomes overloaded, thus causing clipping in the collector circuit and rectification across the base-to-emitter junction which distortions result in cross modulation in the received signal so that spurious frequencies are likely to be developed.

More specifically, the landing signal ordinarily consists of two overlapping radio beams; one beam being modulated by a 90 cycle per second signal and the other beam modulated by a 150 cycle per second signal. The accuracy with which the aircraft approaches the field when using this landing signal depends upon the accuracy with which it can detect the 90 and 150 cycle per second signals. As a result of the intermodulation (also referred to as cross modulation) mentioned above, spurious signals having frequencies near 90 and 150 cycles per second are produced, thus producing faulty indications in the visual detectors on the pilot's instrument panel.

An object of the present invention is to provide a transistorized R-F amplifier stage in an airborne radio receiver which will not produce faulty signals as the aircraft approaches the landing field.

Another object of the invention is a transistorized amplifier stage which will function over a large range of signal amplitudes without introducing cross modulation or other distortions into the received signal.

A further object of the invention is the improvement of automatic gain controls for transistorized amplifiers, generally.

In accordance with one preferred form of the invention there is provided in an amplifier stage a PNP transistor having a base electrode, a collector electrode, and an emitter electrode.

An emitter load resistor connects the emitter to the positive terminal of a D.C. power supply, and a collector load circuit, which may be a tuned circuit, connects a collector electrode to the negative terminal of the power supply. Biasing means for the base electrode is supplied by a voltage divider connected between the positive terminal of the power supply and an automatic gain control voltage (AGC) source with the tap of the voltage divider being connected to the base electrode. A Zener diode is connected across the emitter circuit load resistor and the D.C. power supply and has a polarity such that its reverse impedance is presented to the over-all voltage appearing across the emitter load resistor and the D.C. power supply. When the transistor approaches overload so that the AGC biasing potential supplied to the base becomes too large, the emitter current will decrease to a point where the resultant voltage across the emitter load resistor and the D.C. power supply will cause the Zener diode to break down, thus clamping the emitter voltage and preventing said emitter voltage from becoming more positive. The transistor will then be substantially nonconductive, except for the conduction through the interelectrode capacitance between the base and the collector electrodes.

In accordance with a feature of the invention, the breakdown of the Zener diode upon overload of the transistor, with subsequent disability of the transistor, will prevent cross modulation and other type distortion due to overload, and thus prevent the formation of spurious signals which could mislead an aircraft approaching a landing field.

In accordance with another feature of the invention, the base-to-collector interelectrode capacitance of the disabled transistor will permit sufficient signal to pass therethrough and into the succeeding stages of the receiver of the aircraft to produce an accurate reading on the visual indicators on the pilot's panel.

The above-mentioned and other objects and features of the invention will be more clearly understood from the following detailed description thereof when read in conjunction with the drawings in which:

FIG. 4 is a characteristic curve of a Zener diode; and

FIG. 5 is a schematic representation of another embodiment of the invention using NPN type transistors instead of the PNP employed in the structure of FIG. 1.

Figure 1:
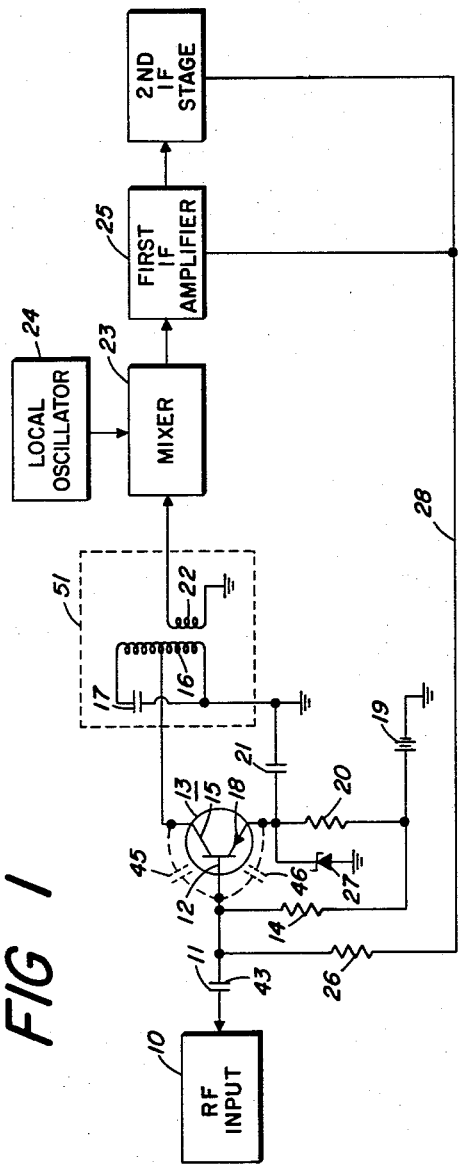
FIG. 1 is a schematic sketch of one form of the invention.

Referring now to FIG. 1, R-F input signal is supplied from block 10, which may represent an antenna, for example, through the capacitor 11 to the base 12 of type PNP transistor 13. The input signal appears across the load resistor 14. In the particular embodiment of the invention shown in FIG. 1, the particular circuit configuration employed is commonly known as common emitter amplifier. The center tap winding 16, in conjunction with the capacitor 17, forms a tuned circuit which comprises the collector load circuit. The emitter 18 is connected to the positive power supply 19 through an emitter load resistor 20. The capacitor 21 forms an R-F by-pass around the resistor 20, thus preventing signal degeneration in the transistor. The output from the amplifier is taken from the secondary winding 22 of transformer 51 and supplied to a mixer 23 along with a signal from the local oscillator 24. The output of the mixer circuit 23, which is an I-F signal, is supplied to I-F amplifier 25 and thence to succeeding conventional receiver stages. The AGC voltage can be taken from a suitable point such as the second I-F stage and supplied back to the first I-F stage 25 and to the base 12 of the resistor 13 through a D.-C. coupling resistor 26.

The Zener diode 27 is connected across the emitter resistor 20 and the battery source 19; that is, the Zener diode 27 is connected between the emitter 18 and ground potential.

The basic function of the Zener diode is to cut off the transistor 13 when an overload condition occurs. It might be noted at this point, however, that even when the transistor is cut off during overload conditions, input signals will still pass from the base 12 to the collector electrode 15 via the base collector interelectrode capacitance 45. Such a signal, although highly attenuated, is undistorted and after passing through the base-collector junction, will be of sufficient magnitude so that an intelligible output signal will be reproduced by the receiver, thus enabling the pilot to accurately determine his approach position from his indicators.

In general, the Zener diode 27 operates in the following manner. Assume that an input signal supplied to the base 12 is increasing in magnitude towards on overload condition. Such increase in magnitude will cause the AGC voltage supplied to the base 12 to become increasingly more positive in an effort to decrease the amplification of the transistor 13 and thus compensate for the increase in magnitude of the input signal. Such increased positive AGC bias voltage will function to reduce the emitter-collector D.C. current and thus reduce the voltage drop across the resistor 20. Consequently, the potential of the emitter 18 will become increasingly more positive. The circuit is designed so that when the input signal reaches a certain magnitude the D.-C. potential of emitter 18 will be sufficiently positive to break down the Zener diode 27.

Figure 2:
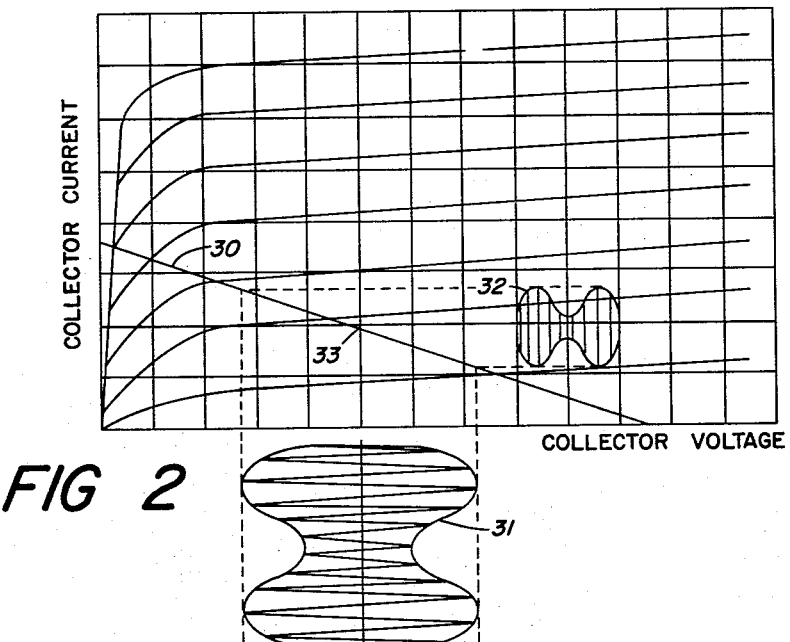
FIGS. 2 and 3 are charts showing characteristic curves of a transistor and also showing how distortion is introduced by overload of the transistor.

More specifically, the Zener diode 27 operates in the following manner. Assume as a first condition that the signal supplied to the base 12 of the transistor 13 (FIG. 1) is within the normal operating range. Such normal operating conditions are shown in FIG. 2 wherein there is a set of characteristic curves of the transistor, a load line 30, and curves 31 and 32 representing the input signal and the output signal. It can be seen that the waveform 31, which represents the input signal, will drive the transistor 16 along the load line 30 to produce the output signal represented by the waveform 32 at the collector terminal 15. It will also be observed that the D.-C. operating point 33 is high enough on the load line 30 so that there is very little distortion introduced in the waveform 32.

When an overload condition occurs, however, the bias on the base 12 increases due to the action of the AGC voltage which is supplied to the base electrode 12 via the conductor 28 and the resistor 26. Such an increase in bias potential will function to reduce the D.-C. component of the emitter current and thus move the D.-C. operating point of the transistor farther down the load line to the point such as the point designated by the reference character 34 in FIG. 3. It can now be seen that the input signal 31' would (in the absence of the Zener diode 27) produce an output signal 32' on the collector electrode 15 of the transistor 13 of FIG. 1. From an examination of the curves of FIG. 3, it is obvious that the positive half cycle of the input signal (the half cycle on the right in FIG. 4) is clipped off due to the fact that the transistor becomes non-conductive during most of such positive half cycle. A closely allied source of distortion during overload condition is caused by the base-to-emitter electrode rectification of the input signal. More specifically, as overload condition is approached and reached the transistor will be almost completely cut off during most of the positive half cycle, but will exhibit an emitter-to-base current during the negative half cycle. This phenomenon is, of course, rectification and, as will be seen later, plays an important role in maintaining the transistor in a cut-off condition during an overload condition.

Figure 3:
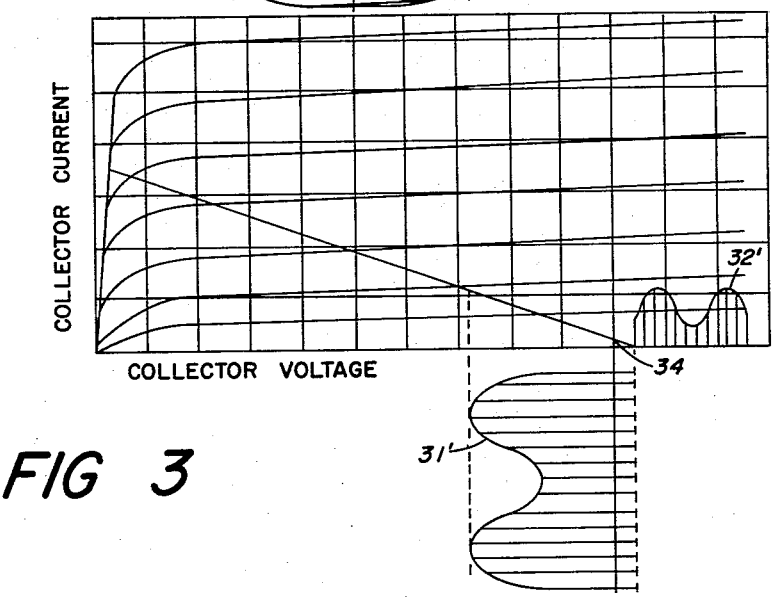

Assume that the overload condition of FIG. 3 is being approached; that is to say, assume that the aircraft is approaching the landing strip and that the received glide slope signal becomes sufficiently strong to approach the overload condition of the transistor. As this overload condition is approached and the operating point 33 in FIG. 2 slides down the load line due to the increased AGC voltage applied to the base 12 of FIG. 1, the D.C. portion of the emitter-to-collector current will become increasingly less. Consequently, the voltage drop across the resistor 20 will become increasingly less. Now, since the Zener diode 27 is connected across both the resistor 20 and the battery source 19 it follows that the potential applied to the cathode of the Zener diode 27 will become increasingly more positive. As indicated hereinbefore, a point is reached where the potential on the cathode of the Zener diode 27 is sufficiently positive to break down the Zener diode. Such breakdown point is represented by the reference character 36 of FIG. 4 which shows the characteristic curve of a Zener diode. When such breakdown occurs the voltage in the emitter electrode 18 will remain constant, even though the voltage on the base may rise positively for a short interval of time thereafter due to the inherent delay involved in the stages following the R-F amplifier and the AGC circuit.

The transistor is now in a cut-off condition. There is, however, an interelectrode capacitance 45 existing between the base electrode 12 and collector 15 which will permit the input signal to pass therethrough and into the output circuit 51 and thence into the following stages of the receiver. This signal, although quite attenuated by the base-to-collector electrode capacitance of the transistor, is still of sufficient magnitude to produce a usable signal at the output of the receiver. Such usable signal is employed to energize the indicators on the pilot's panel board to indicate whether the plane is on the glide slope path.

It should be noted, perhaps, at this time that if the transistor had not been disabled during such overload condition a distorted signal would have entered the subsequent stages of the receiver and then used to energize the meters on the pilot's panel board. Such distorted signal would, very likely, contain spurious components having frequencies in the vicinity of 90 c.p.s. and 150 c.p.s. which could produce faulty indications in the pilot's visual indicators.

It will be noted that there are two principal factors which tend to maintain the transistor 13 in a cut-off condition. The first of these factors is the AGC potential supplied to the base electrode 12. The second factor is the base-to-emitter rectification of the input signal supplied to the base 12. More specifically, during the negative half cycle of the input signal a small current will be diverted from the Zener diode 27 and flow from the emitter 18 to the base 12 to produce a positive charge on the plate 43 of capacitor 11. This positive charge is not discharged during the positive half cycle of the input signal since during most of said positive half cycle the base electrode 12 will be more positive than the emitter electrode 18 so that the impedance thereacross will be considerably greater than during the negative half cycle.

A further point to be considered concerning the action of the AGC voltage is that as soon as the transistor 13 is caused to assume a cut-off position the need for a high AGC potential will be eliminated so that the AGC supply to the base 12 will tend to go in a negative direction. Seeking to maintain a high positive bias on the base 12, however, is the rectifying action upon the input signal by the base-to-emitter junction, as described above. By proper design of the circuit, the amount of energy supplied to the capacitor 11 due to the rectification action of the emitter-to-base junction can be made to be equal to the energy dissipated through the AGC resistor 26 at a given level of input signal so that the transistor will remain in cut-off condition until the input signal decreases below said given level. Alternatively, the circuit of FIG. 1 could be designed so that the total charge of the capacitor 11 can be made to decrease slightly at any given level of input signal so that the base-to-emitter biasing potential would decrease over a given interval of time, say several hundred milliseconds, to the point where the transistor would become conductive and collector current would be re-established. Then, of course, the Zener diode 27 would return to its high impedance condition.

It will be apparent that the operating characteristic of the Zener diode must be such that the knee 36 of its operating characteristic curves shown in FIG. 4 is sharp and, further, that the reverse Zener diode resistance in the breakdown region (i.e., portion 38 of the curve of FIG. 4) must be very small. Unless these characteristics are present in the Zener diode a slow oscillation, commonly known as motor boating, will occur around the knee 36 of the curve and also in the breakdown region 38. More specifically, if the knee 36 of the curve of FIG. 4 were not sharp and if the breakdown region 38 did not represent a very small resistance, the effect would be that the voltage across the Zener diode would vary in that as breakdown began to occur and current was diverted from the emitter electrode 18 to the Zener diode 27, the collector current would be reduced and the requirement for AGC would be reduced, thus causing the AGC potential to become less. As the AGC potential decreases, the emitter current would tend to increase, thus diverting some of the current from the Zener diode back to the emitter circuit. This, in turn, would cause an increase in the emitter current which would be reflected back through the AGC line to produce an increase in the AGC biasing potential, thus completing the slow oscillation cycle and starting a new one.

In FIG. 5 there is shown an alternative form of the invention. The principal difference between the structure of FIG. 5 and the structure shown in FIG. 1 is that in the structure of FIG. 5 an NPN transistor is used instead of a PNP type transistor. Appropriate changes in the polarity of the battery source 38 and the Zener diode 39 have been made. It is to be noted that components in the structure of FIG. 5 which have corresponding components in the structure of FIG. 1 are represented by the same reference characters, although primed.

The operation of the structure of FIG. 5 is quite similar to that of FIG. 1. The current flow in the collector-to-emitter electrode is, of course, reversed as is the polarity of the power supply 38 and the polarity of the Zener diode 39. The biasing potential on the base 40 of the transistor 46 is now positive with respect to the potential of the emitter electrode 42, and the AGC potential supplied to the base 40 through the resistor 26' will increase in a negative polarity as the magnitude of the input signal increases instead of in a positive direction. Also, the rectifying action of the base 40 to emitter electrode 42 junction during an overload condition will produce a negative charge in the plate 43' of the capacitor 11' instead of a positive charge. The potential developed across the Zener diode 39 will be a negative potential. More specifically, the potential across the Zener diode 39 will be equal to the potential of the negative battery 38 minus the potential drop across the resistor 20'. Since the negative potential of the battery 38 is greater than the positive potential drop of the resistor 20' the voltage applied to the anode of the diode 39 is always negative. When an overload condition of sufficient magnitude develops, the negative voltage supplied to the anode of Zener diode 39 will cause a breakdown of the said diode so that the transistor 46 will be cut off in much the same manner as was discussed in connection with the transistor 13 of FIG. 1. The same considerations relating to the sharpness of the knee and the very low reverse breakdown resistance of the Zener diode 39, the AGC potential supplied to the base 40 and the rectification function of the base-to-emitter electrodes during overload, that were discussed in connection with the structure of FIG. 1 are also applicable to the structure of FIG. 5. Similarly, the base 40 to collector 41 interelectrode capacitance during cut-off to the transistor 46 is sufficient to pass enough of the signal into the remaining stages of the receiver to actuate the pilot's visual aids.

An additional difference in the structure between FIGS. 1 and 5 is that in FIG. 5 the capacitor 50 is shown as being connected in parallel with the resistor 20' rather than being connected directly to ground potential, as shown by the capacitor 21 of FIG. 1. Capacitor 50 of FIG. 5 still functions as an R.-F. by-pass capacitor, however, so as to avoid degeneration of the signal being amplified in the transistor 46.

It is to be noted that throughout the description of this invention reference has been made to the use thereof in connection with glide slope signals received by an aircraft approaching a landing strip. It is to be clearly understood that the example of an aircraft approaching a landing strip is merely employed to provide a background setting whereby the invention may be more clearly understood. The invention is not limited in any way to such use or to any particular type of input signals such as the 90 c.p.s. and 150 c.p.s. signals employed in approach modes of aircraft navigation, but can be used in many other type applications and with many other type signals.

It is to be further noted that although the forms of the invention described herein are preferred embodiments thereof, various changes may be made in circuit arrangement without departing from the spirit or the scope thereof.

I claim:

1. In a receiver having means for generating an AGC voltage, an amplifier comprising a transistor having a base electrode, an emitter electrode, and a collector electrode, means including first capacitor means for supplying an intelligence bearing signal to said base electrode, a D.C. power supply, first impedance means connecting a first terminal of said D.C. power supply to said emitter electrode, second impedance means connecting the collector electrode to the second terminal of said D.C. power supply, second capacitor means connecting said emitter electrode to a terminal of said D.C. power supply, a load resistor connected between said base electrode and a terminal of said D.C. power supply, and a Zener diode connected between the said emitter electrode and the second terminal of said D.C. voltage source, said Zener diode connected to have its high back impedance presented to the voltage appearing on said emitter electrode, said Zener diode constructed to break down in response to the voltage impressed thereacross when the magnitude of the direct current biasing potential supplied to said base crosses a predetermined threshold.

2. An amplifier in accordance with claim 1 in which said transistor is a PNP type transistor.

3. An amplifier in accordance with claim 1 in which said transistor is of the NPN type.

References Cited in the file of this patent

UNITED STATES PATENTS

| 2,693,572 | Chase | Nov. 2, 1954 |
| 3,052,853 | Smith | Sept. 4, 1962 |

OTHER REFERENCES

Radio-Electronics, vol. 32, No. 2, February 1961, page 40, FIG. 4.